(12) United States Patent
Horn

(10) Patent No.: US 12,386,834 B1
(45) Date of Patent: Aug. 12, 2025

(54) USING WORST-CASE PREDICATE SELECTIVITY FOR DATABASE QUERY PLANS

(71) Applicant: SAP SE, Walldorf (DE)

(72) Inventor: Oliver Horn, Nussloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/745,393

(22) Filed: Jun. 17, 2024

(51) Int. Cl.
 G06F 16/24 (2019.01)
 G06F 16/2453 (2019.01)

(52) U.S. Cl.
 CPC .................. G06F 16/24542 (2019.01)

(58) Field of Classification Search
 CPC ................................. G06F 16/24542
 See application file for complete search history.

(56) References Cited

U.S. PATENT DOCUMENTS

| | | | | |
|---|---|---|---|---|
| 6,865,567 | B1 * | 3/2005 | Oommen | G06F 16/24542 |
| 11,016,973 | B2 * | 5/2021 | Merker | G06F 16/24542 |
| 2004/0060007 | A1 * | 3/2004 | Gottlob | G06F 16/8373 |
| | | | | 707/E17.131 |
| 2013/0159321 | A1 * | 6/2013 | Bossman | G06F 16/24542 |
| | | | | 707/748 |
| 2022/0050843 | A1 * | 2/2022 | Hu | G06F 18/217 |
| 2024/0020515 | A1 * | 1/2024 | Zeighami | G06N 3/084 |

OTHER PUBLICATIONS

U.S. Appl. No. 18/745,366, filed Jun. 17, 2024, Horn.
U.S. Appl. No. 18/745,430, filed Jun. 17, 2024, Horn.

\* cited by examiner

*Primary Examiner* — Eliyah S. Harper
(74) *Attorney, Agent, or Firm* — Fish & Richardson P.C.

(57) ABSTRACT

The present disclosure involves systems, software, and computer implemented methods for using worst-case predicate selectivity for database query plans. One example method includes identifying a query that includes an initial set of parameter values for a set of predicates. An order of predicate evaluation is determined for a query plan by determining a worst-case selectivity for each predicate and ordering the predicates based on the worst-case selectivities. A second instance of the query is received that includes a second set of parameter values. The second instance of the query is executed, to generate a query result, using the query plan and the second set of parameters by evaluating the set of predicates based on the second set of parameters and the order of predicate evaluation determined based on the worst-case selectivities. The query result is provided in response to the second instance of the query.

20 Claims, 6 Drawing Sheets

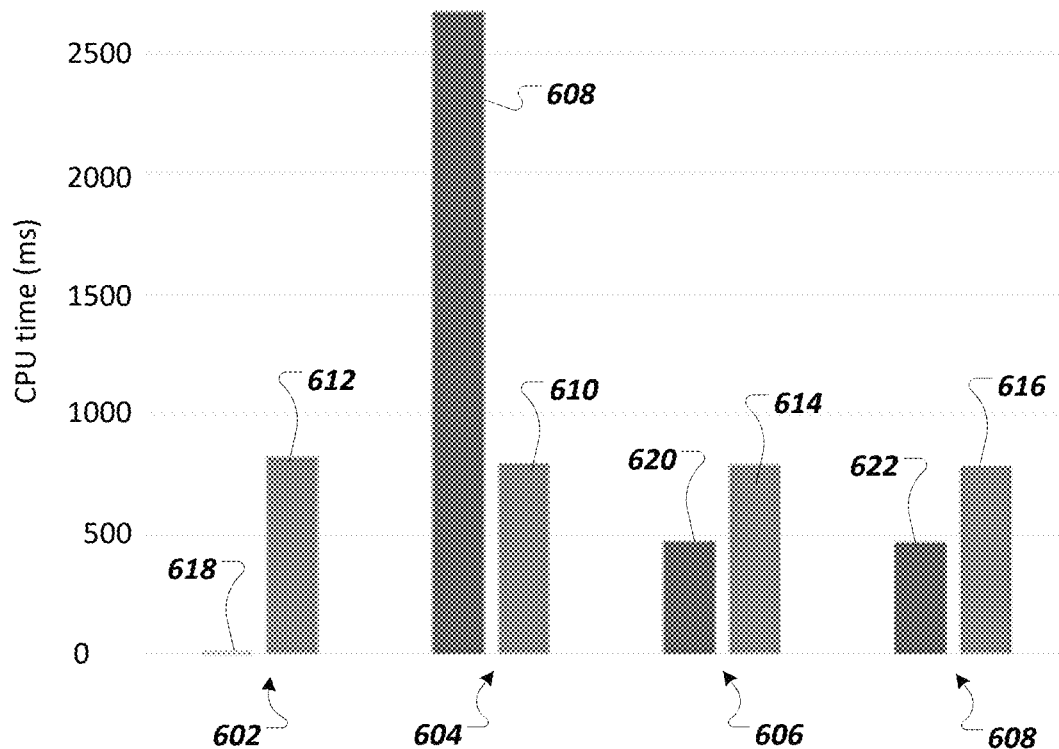
FIG. 6  *600*

USING WORST-CASE PREDICATE SELECTIVITY FOR DATABASE QUERY PLANS

TECHNICAL FIELD

The present disclosure relates to computer-implemented methods, software, and systems for using worst-case predicate selectivity for database query plans.

BACKGROUND

A database system can develop a query execution plan for a query. The query execution plan can represent a sequence of operations to access data in a database when executing the query. The database may also include a query plan optimizer to determine an efficient way to execute the query plan.

SUMMARY

The present disclosure involves systems, software, and computer implemented methods for using worst-case predicate selectivity for database query plans. An example method includes: identifying, at a database system, a first instance of a query for a database table, wherein the first instance of the query includes an initial set of parameter values for a set of predicates; determining an order of predicate evaluation for the set of predicates for a query plan for the query based on the initial set of parameter values and the set of predicates, wherein determining the order of predicate evaluation comprises: determining, for each predicate in the set of predicates, a worst-case selectivity for the predicate; and determining the order of predicate evaluation for the set of predicates based on worst-case selectivities of predicates in the set of predicates; receiving a second instance of the query that includes a second set of parameter values; executing the second instance of the query, to generate a query result, using the query plan and the second set of parameter values by evaluating the set of predicates based on the second set of parameter values and the order of predicate evaluation determined based on worst-case selectivities of predicates in the set of predicates; and providing the query result in response to the second instance of the query.

Implementations may include one or more of the following features. Selectivity of a given predicate can correspond to a percentage of table rows of the database table that are estimated to match the given predicate. The worst-case selectivity for a first predicate can be determined, based in part, on an operator type of the first predicate. Determining the worst-case selectivity for the first predicate can include: determining that the operator type of the first predicate is an equals operator; obtaining frequency metadata for a database column referenced by the first predicate that includes frequencies of most-frequently occurring values in the database column; and determining, as the worst-case selectivity for the first predicate, a frequency of a highest-occurring value in the database column. Determining the worst-case selectivity for the first predicate can include: determining that the operator type of the first predicate corresponds to a range operation; and determining, as the worst-case selectivity for the first predicate, a selectivity value of one. Determining the order of predicate evaluation for the set of predicates based on worst-case selectivities of predicates in the set of predicates can include ordering the predicates in an ascending worst-case selectivity order. Determining the order of predicate evaluation for the set of predicates based on worst-case selectivities of predicates in the set of predicates can include ordering the predicates based on a cost function that includes, for an input predicate, among other inputs, the worst-case selectivity of the input predicate. A secondary ordering of predicate evaluation can be performed based on estimated selectivities of predicates in the set of predicates determined based on the initial set of parameters. Performing the secondary ordering can include identifying two or more predicates that have a same worst-case selectivity and ordering the two or more predicates based on the estimated selectivities of predicates in the set of predicates determined based on the initial set of parameters. An estimated selectivity of a first predicate of the two or more predicates can be determined based on: locating a first parameter value in the initial set of parameter values in frequency statistic metadata for the database table; and determining the estimated selectivity of the first predicate by identifying a frequency for the first parameter value in the frequency statistic metadata. An estimated selectivity of a first predicate of the two or more predicates can be determined based on sampling the database table and determining a frequency of sampled rows of the database table that match the first predicate with respect to a parameter value in the initial set of parameter values. An estimated selectivity of a first predicate of the two or more predicates can determined by: determining that a column referenced in the first predicate stores unique values; and determining the estimated selectivity of the first predicate by dividing a value of one by a row count of the database table. Determining a worst-case selectivity for a given predicate can include estimating a highest possible selectivity for the predicate. The set of predicates can be included in a conjunction.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 6 is a graph that illustrates results of ordering evaluation of query predicates based on worst-case selectivity estimates.

DETAILED DESCRIPTION

A database system can use various approaches to determine a best order to evaluate predicates of a database query, in terms of query performance and computing resource usage. For example, some approaches can be compile-time approaches which generate a query plan that can be reused for queries of a same form. In some cases, queries of a same form can be parameterized queries that have similar types of parameters for which actual parameters are provided at runtime. A query plan can be generated and reused for parameterized queries. Compile-time approaches can include estimating selectivity of query predicates and ordering predicate evaluation based on selectivity estimates. In some cases, selectivity estimates can be determined based on a first set of parameters received for the query for a query execution. Other approaches can include estimating worst-case selectivity for predicates at compile time, to improve performance for scenarios where selectivity of runtime parameters substantially differ (e.g. in a skewed data set) from the parameters in the first set of parameters. However, while using worst-case compile-time selectivity estimates can substantially improve performance for some cases, other cases with other parameters may suffer some performance degradation. As a combined approach, runtime adaptive techniques can also be used that involve determining estimated runtime selectivities of parameters using actual parameters at runtime, and possibly modifying a query plan (e.g., predicate order evaluation, and for some cases, evaluation strategies such as index lookup or scan), based on runtime calculations. Accordingly, through a combination of approaches, best or better performing query execution strategies can be selected and performed, thus saving significant computing resources as compared to a single approach or other approaches.

Figure 1:
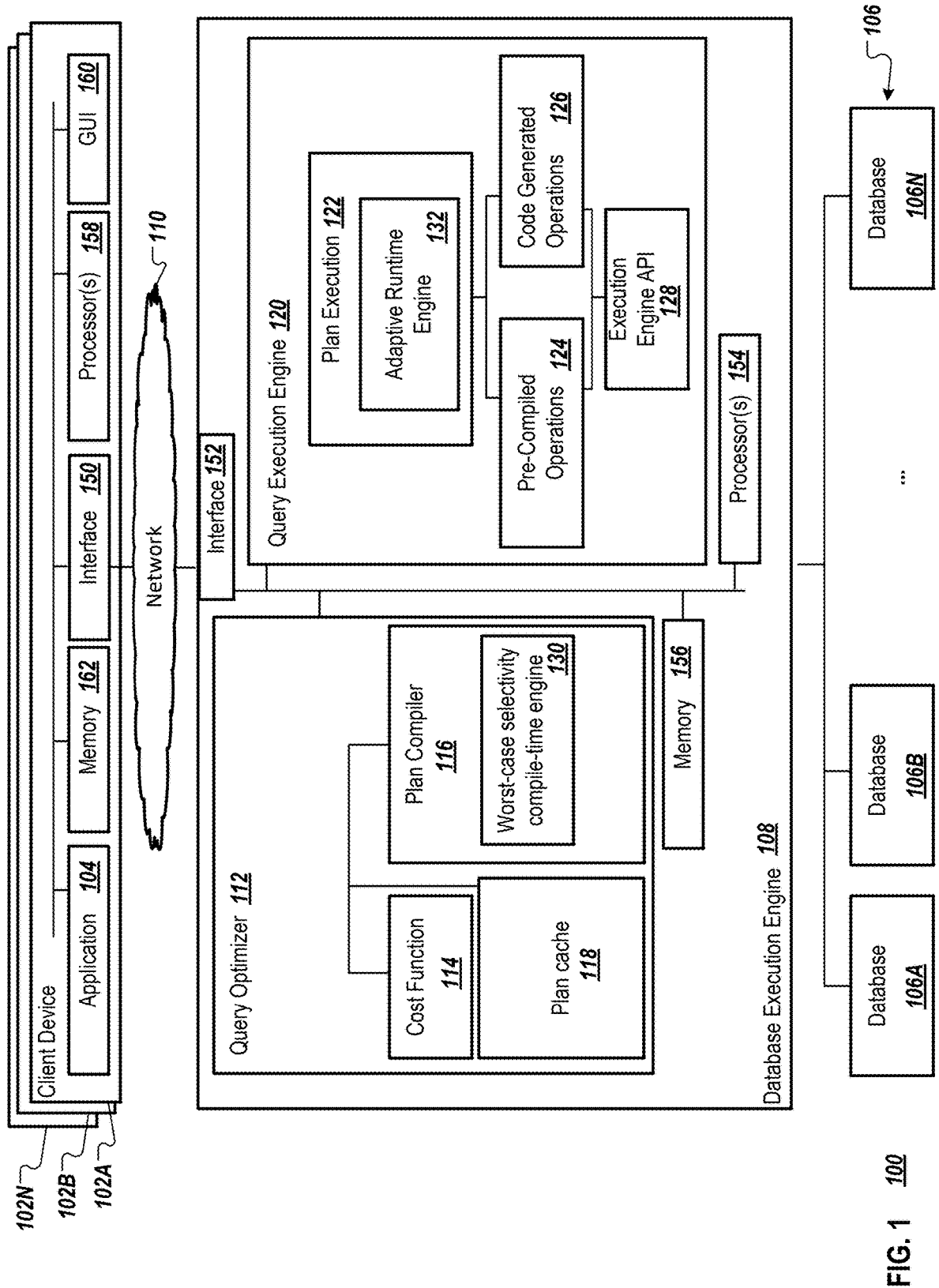
FIG. 1 is a block diagram illustrating an example system for database query execution.

FIG. 1 is a block diagram illustrating an example system 100 for database query execution. Although shown separately, in some implementations, functionality of two or more systems may be provided by a single system. In some implementations, the functionality of one illustrated system or component may be provided by multiple systems or components, respectively.

The system 100 may include one or more client devices 102A-N. Each client device 102 may include a user interface, such as a browser or other application 104 to enable access to one or more applications, database layer(s), and/or databases, to generate queries to one or more databases 106A-N, and/or to receive responses to those queries.

In the example of FIG. 1, the databases 106A-N represent a database layer 106 of a database management system where data may be persisted and/or stored in a structured way, and where the data can be queried or operated on using operations including SQL (Structured Query Language) commands or other types of commands/instructions to provide reads, writes, and/or perform other operations. To illustrate by way of an example, client device 102A may send a query via a database execution engine 108 to the database layer 106, which may represent a persistence and/or storage layer where database tables may be stored and/or queried. The query may be sent over a network 110.

The database execution engine 108 may include a query optimizer 112, such as a SQL optimizer and/or another type of optimizer, to receive at least one query from a client device and generate a query plan (which may be optimized) for execution by the database execution engine 108. The query optimizer 112 may receive, for example, a request, such as a query, and then form or propose an optimized query plan. The query plan (which may be optimized) may be represented as a "query algebra" or "relational algebra."

For example, a query requesting operations of "SELECT Columns from Table A and Table B, and perform an INNER JOIN on Tables A and B" may represent a query processed by the query optimizer 112. There may be several ways of implementing execution of the query. Accordingly, a query plan generated by the query optimizer 112 may offer hints or propose an optimum query plan with respect to the execution time of an overall query. To optimize a query, the query optimizer 112 may obtain one or more costs for the different ways the execution of the query plan can be performed. The costs may be obtained from a cost function 114 which responds to the query optimizer 112 with the cost(s) for a given query plan (or portion thereof), where costs may be expressed in terms of execution time at the database layer 106, for example.

To compile a query plan, the query optimizer 112 may provide the query plan to a query plan compiler 116 to enable compilation of some, if not all, of the query plan. The query plan compiler 116 may compile query algebra into operations, such as program code and/or any other type of command, operation, object, or instruction. The program code may include pre-compiled code (which can be pre-compiled and stored, and then selected for certain operations in the query plan) and/or just-in-time code generated specifically for execution of the query plan. For example, the query plan compiler 116 may select pre-compiled code for a given operation as part of the optimization of the query plan, while for another operation in the query plan the plan compiler may allow a compiler to generate the code. The pre-compiled and generated code represent code for executing the query plan. Generated query plans can be stored in a query plan cache 118.

A query execution engine 120 may receive, from the query optimizer 112, compiled code to enable execution of the optimized query plan. The query execution engine 120 can forward the compiled code to a query plan execution engine 122. The query plan execution engine 122 can prepare the query plan for execution, where the query plan may include pre-compiled code 124 and/or generated code 126. When the code for the query plan is ready for execution during runtime, the query execution engine 120 may step through the code performing some of the operations within the database execution engine 108 and/or sending some of the operations (or commands in support of an operation, such as a read, write, and/or the like) to an execution engine application programming interface (API) 128 for execution at the database layer 106.

The query plan compiler 116 can, as part of query plan compilation, determine a strategy and order of evaluating the filter predicates on a table. Selectivity of a predicate can be a value between zero and one which represents a percentage of table rows that match the predicate. Using a strategy of evaluating the filter predicates in ascending order of estimated selectivities can result in reduced processing time and memory use during query evaluation.

For example, suppose a query is "SELECT * FROM T WHERE A=? AND B<?" where the table T has one million rows. Suppose also that the estimated selectivity of the predicate "B<?" is 0.001 and the estimated selectivity for the predicate "A=?" is 0.5 and that the columns A and B are not correlated. If the query execution engine 120 would start the evaluation of the query on the one million rows with the predicate "A=?" an intermediate result would be approximately 500,000 rows (based on the estimated selectivity of the predicate) and the query execution engine 120 can then continue with evaluating the predicate "B<?" on those 500,000 rows to identify 500 rows as a query result. However, if the query execution engine 120 were to instead start the evaluation on the one million rows with the predicate "B<?" the query execution engine 120 can generate an intermediate result of only 1,000 rows and then continue with the evaluation of the predicate "A=?" on that smaller intermediate result to ultimately identify the same 500 row query result. With the second approach, the intermediate result would be 1/500th of the size of the intermediate result of the first approach and the query execution engine 120 would need to scan less rows as compared to the first approach.

In some implementations, consideration and evaluation of predicate ordering is performed (e.g., at compile time and as described below, in some cases at runtime) for a set of predicates in a conjunction (e.g. involving one or more "AND" operators), as for the example query above. Since all predicates in a conjunction have to match for a final result, small intermediate results help decrease residual search spaces. For a set of predicates in a disjunction (e.g., involving one or more OR operators), each predicate is evaluated, so the database system may not determine predicate order evaluation or reordering for those predicates.

For parameterized queries, the query plan compiler 116 (or more generally the query optimizer 112) can estimate selectivity of parameterized predicates by using parameter values supplied for a first execution of the query. The query plan compiler 116 can estimate selectivities of predicates based on a first parameter set can by sampling or evaluating top-K value statistics per column which contain the K most-frequent values and their frequency, for example.

For instance, suppose the first parameter set for the query "SELECT * FROM T WHERE A=? AND B<?" is (1, 'x'). The query plan compiler 116 can identify a sample of 1,000 rows from the one million rows of the table T and determine how many rows have a value of 1 for column A. If the value of 1 is included for column A in 500 of the sampled rows the query plan compiler 116 can determine an estimated selectivity of the predicate "A=1" (and thus also for the parameterized predicate "A=?") as 0.5. Similar sampling processing can be performed for the "B<'x'"/"B<?" predicates. For example, an estimated selectivity of 0.001 may be calculated for the "B<'x'" predicate.

The query plan compiler 116 can use other approaches for estimating predicate selectivity. For instance, if a given parameter value in a first parameter set is included in the top-K statistics then the query plan compiler 116 can identify, in an entry in the top-K statistics for the column, the selectivity of certain types of predicates (and use the predicate selectivity of the predicate with the first parameter value as an estimated selectivity for the parameterized predicate). For example, such an approach can be used for equals predicates if the parameter value for the equals predicate is included in the top-K statistics. As another example, this approach can be used for an in-list predicate (e.g., "A IN (?, ?, ?) if all parameter values for the in-list predicate are included in the top-K statistics. In other cases, the query plan compiler 116 can determine or identify that values in a given column are unique and that, accordingly, a selectivity of e.g., an equals or an in-list predicate on the column is at most one. The query plan compiler 116 can determine the estimated selectivity for an equals predicate, for example, by calculating a value of one divided by the row count of the table. For an in-list predicate, the query plan compiler 116 can determine the estimated selectivity by calculating a value of a count of in-list elements divided by the row count of the table.

Using estimated selectivities determined from a first parameter set can work well when a data distribution of a column is relatively evenly distributed, but problems can occur when reusing a query plan based off of a first parameter value if the data distribution is not well balanced. For instance, data in a column may include a relatively small set of one or more values that occur frequently in the table and a larger set of values that each occur at a significantly lower frequency. For example, continuing the example above where estimated selectivities of 0.5 and 0.001 were calculated for the "A=?" and "B<?" predicates, based on first parameter set values of 1 and 'x', respectively, suppose that the value 2 occurs only once in the column A and that the predicate "B<'y'" matches 200,000 rows of the table. In this example, a previously determined order of evaluating "B<?" first and "A=?" second would not be a desired query plan (e.g., because evaluating the predicate on column B would result in a larger intermediate result).

To solve such problems that may occur with skewed data sets, a worst-case selectivity compile-time engine 130 can determine order of predicate evaluation based at least in part on estimated worst-case selectivities of predicates, which can result in avoidance of using query plans that result in poor query evaluation performance. Worst-case compile time predicate ordering is described in more detail below with respect to FIG. 2.

As illustrated below with respect to FIG. 6, an approach of using worst-case selectivity estimates can improve query performance in various situations, including avoiding what would have otherwise been particularly poor-performing query plans. However, some cases may see some performance degradation if predicate evaluation is performed using worst-case data. To avoid these degradation cases while still achieving benefits of worst-case approaches, the query plan execution engine 122 can use an adaptive runtime engine 132 that may modify a query plan based on estimated runtime selectivities, a count of matching values of respective predicates, and/or settings in an existing query plan. The adaptive runtime engine 132 and query plan modification is discussed in more detail below with respect to FIG. 3.

The database layer 106 may be implemented using one or more data storage approaches, including disk storage and/or memory. Although shown as physically separate from the database execution engine 108, in some implementations, data of the database layer 106 may reside in memory 156 of the database execution engine 108 (and/or in memory of other systems or servers).

As used in the present disclosure, the term "computer" is intended to encompass any suitable processing device. The database execution engine 108 and the client devices 102 may each be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the database execution engine 108 and the client devices 102 may be adapted to execute any operating system, including Linux, UNIX, Windows, Mac OS®, Java™, Android™, iOS or any other suitable operating system.

Interfaces 150 and 152 are used by the client device 102A and the database execution engine 108, respectively, for communicating with other systems in a distributed environment—including within the system 100—connected to the network 110. Generally, the interfaces 150 and 152 each comprise logic encoded in software and/or hardware in a suitable combination and operable to communicate with the network 110. More specifically, the interfaces 150 and 152 may each comprise software supporting one or more communication protocols associated with communications such that the network 110 or interface's hardware is operable to communicate physical signals within and outside of the illustrated system 100.

The database execution engine 108 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the database execution engine 108. Specifically, each processor 154 executes the functionality required to receive and respond to requests from the client devices 102, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The database execution engine 108 includes the memory 156. In some implementations, the database execution engine 108 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the database execution engine 108. As mentioned, some or all of the data of the database layer 106 may reside in the memory 156 (and/or may reside in other memory and/or in disk storage of one or more systems).

The client devices 102A-N may each generally be any computing device operable to connect to or communicate with the database execution engine 108 via the network 110 using a wireline or wireless connection. In general, each client device 102A-N comprises an electronic computer device operable to receive, transmit, process, and store any appropriate data associated with the system 100 of FIG. 1. Each client device 102A-N can include one or more client applications, including the application 104. A client application is any type of application that allows the client device to request and view content on the client device. In some instances, a client application may be an agent or client-side version of the one or more enterprise applications running on an enterprise server (not shown).

Each client device 102A-N further includes one or more processors 158. Each processor 158 included may be a central processing unit (CPU), an application specific integrated circuit (ASIC), a field-programmable gate array (FPGA), or another suitable component. Generally, each processor 158 executes instructions and manipulates data to perform the operations of the respective client device. Specifically, each processor 158 included executes the functionality required to send requests to the database execution engine 108 and to receive and process responses from the database execution engine 108.

Each client device 102A-N is generally intended to encompass any client computing device such as a laptop/notebook computer, wireless data port, smart phone, personal data assistant (PDA), tablet computing device, one or more processors within these devices, or any other suitable processing device. For example, each client device 102A-N may comprise a computer that includes an input device, such as a keypad, touch screen, or other device that can accept user information, and an output device that conveys information associated with the operation of the database execution engine 108, or the client device itself, including digital data, visual information, or a GUI 160.

The GUI 160 of a client device 102 interfaces with at least a portion of the system 100 for any suitable purpose, including generating a visual representation of the application 104. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in each client device 102A-N may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device.

There may be any number of client devices 102A-N associated with, or external to, the system 100. Additionally, there may also be one or more additional client devices 102 external to the illustrated portion of system 100 that are capable of interacting with the system 100 via the network 110. Further, the term "client", "client device" and "user" may be used interchangeably as appropriate without departing from the scope of this disclosure. Moreover, while the client devices 102A-N are described in terms of being used by a single user, this disclosure contemplates that many users may use one computer, or that one user may use multiple computers.

Figure 2:
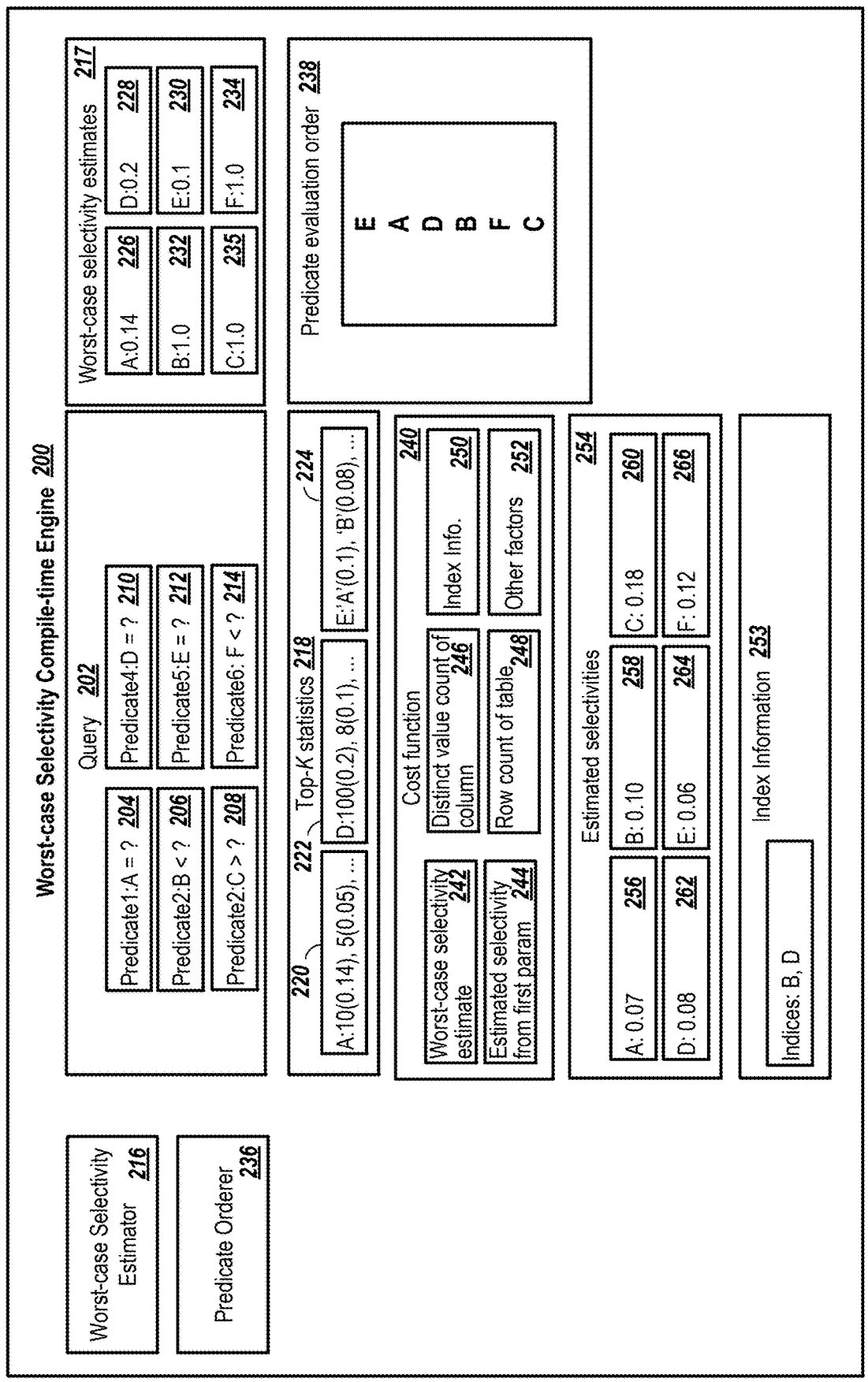
FIG. 2 illustrates an example worst-case selectivity compile-time engine.

FIG. 2 illustrates an example worst-case selectivity compile-time engine 200. The worst-case selectivity compile-time engine 200 can be the worst-case selectivity compile-time engine 130 described above with respect to FIG. 1. The worst-case selectivity compile-time engine 200 (or more generally, the query plan compiler 116) can determine and consider worst-case selectivities of query predicates when determining an evaluation order for evaluating filter predicates included in a received query.

As an example, a query 202 includes predicates 204, 206, 208, 210, 212, and 214. A predicate can include an operator. For instance, the predicates 204, 210, and 212 include an "is equals to" operator (e.g., "="), the predicates 206 and 214 include an "is less than" operator (e.g., "<"), and the predicate 208 includes an "is greater than" operator (e.g., ">"). A worst-case selectivity estimator 216 can determine worst-case selectivity estimates 217 for query predicates, based, for example, on an operator type and, for some operator types, on top-K statistics 218.

For instance, the worst-case selectivity estimator 216 can determine worst-case selectivity for predicates that have an "is equal to" operator based on identifying a most-frequently occurring value in a column from the top-K statistics 218. For example, the top-K statistics 218 can include, for a given database column, "top-K" value statistics which include the K most-frequent values in the column and their frequency (e.g., where K is a predetermined number). For instance, top-K statistics 220 for column A indicate that values of ten and five account for fourteen and five percent of column A values, respectively. Top-K statistics 222 for column D indicate that values of 100 and 8 account for twenty and ten percent of column D values, respectively. Top-K statistics 224 for column E indicate that values of 'A' and 'B' account for ten and eight percent of column E values, respectively.

The worst-case selectivity estimator 216, therefore, can determine worst-case selectivities of 0.14 226, 0.2 228, and 0.1 230 for columns A, D, and E, respectively, based on respective frequencies of the most-frequently occurring values of those columns indicated by the top-K statistics 218. For operator types other than "is equal to", the worst-case selectivity estimator 216 may not be able to determine a worst case selectivity estimate for a predicate of those operator types, other than a selectivity of 1.0 (e.g., indicating that in a worst case all rows may be selected based on the predicate). For instance, for the predicates 206 and 214 that include an "is less than" operator for column B or F, a worst case with respect to selectivity may be that a query parameter is larger than any value in column B or F, respectively (e.g., resulting in all rows being selected). Accordingly, the worst-case selectivity estimator 216 can determine worst-case selectivities of 1 232 and 1 234 for columns B and F, respectively Similarly, for the predicate 208 that includes an "is greater than" operator for column C, a worst case with respect to selectivity may be that a query parameter is smaller than any value in column C (e.g., resulting in all rows being selected). Accordingly, the worst-case selectivity estimator 216 can determine a worst-case selectivity of 1 235 for column C.

A predicate orderer 236 (which may be part of the worst-case selectivity compile-time engine 200 or, more generally, the query plan compiler 116) can determine a predicate evaluation order 238 based, in part, on the worst-case selectivity estimates 217. For example, the predicate orderer 236 can determine the predicate evaluation order 238 based on a cost function 240 that can refer to, for a given predicate, some or all of a worst-case selectivity estimate 242, an estimated selectivity 244 (e.g., from a first query execution with first query parameter(s)), a distinct value count of the column 246, a row count of the table 248, index information 250, and possibly other factors 252. For instance, the index information 250 can refer to index information 253 that indicates that indexes exist for columns B and D.

Index information can be an important factor used by the query plan compiler 116 regarding determining a scan/lookup strategy for each filter predicate. For example, if the index information 253 includes an index for a column an index lookup can be performed (rather than a row-by-row scan) to obtain a list of matching rows that match the predicate. An index lookup may be cheaper in terms of resources than a row-by-row scan. Since there are indices on columns B and D the query plan compiler 116 may adjust the predicate evaluation order 238 so that evaluation of column D and/or B occurs earlier than illustrated. As described in more detail below, index considerations that may be included in a query plan may be considered and adjusted adaptively at run time.

As illustrated, the predicate evaluation order 238 determined, for this example, by the predicate orderer 236 based on results of the cost function 240 has a column evaluation order of E, A, D, B, F, C, which, in this example, aligns with an ascending worst-case selectivity order of those columns.

In some implementations, the cost function 240 can be configured so that the predicate orderer 236 uses estimated selectivities 254 (e.g., that include respective selectivity estimates 256, 258, 260, 262, 264, and 266 for columns A, B, C, D, E, and F, respectively) as a secondary ordering criteria for predicates that have a same worst-case selectivity estimate. For instance and as mentioned, some predicates having certain types of operators (e.g., for range predicates) may all have a worst-case selectivity estimate of 1.0. For example, each of columns B, C, and F have a worst-case selectivity estimate of 1.0 but can be ordered among that set of columns based on the selectivity estimates 258, 260, and 266 of 0.1, 0.18, and 0.12, respectively. That is, the columns B, C, and F can be ordered within that set with an order of B, F, C (e.g., as illustrated in the predicate evaluation order 238).

Figure 3:
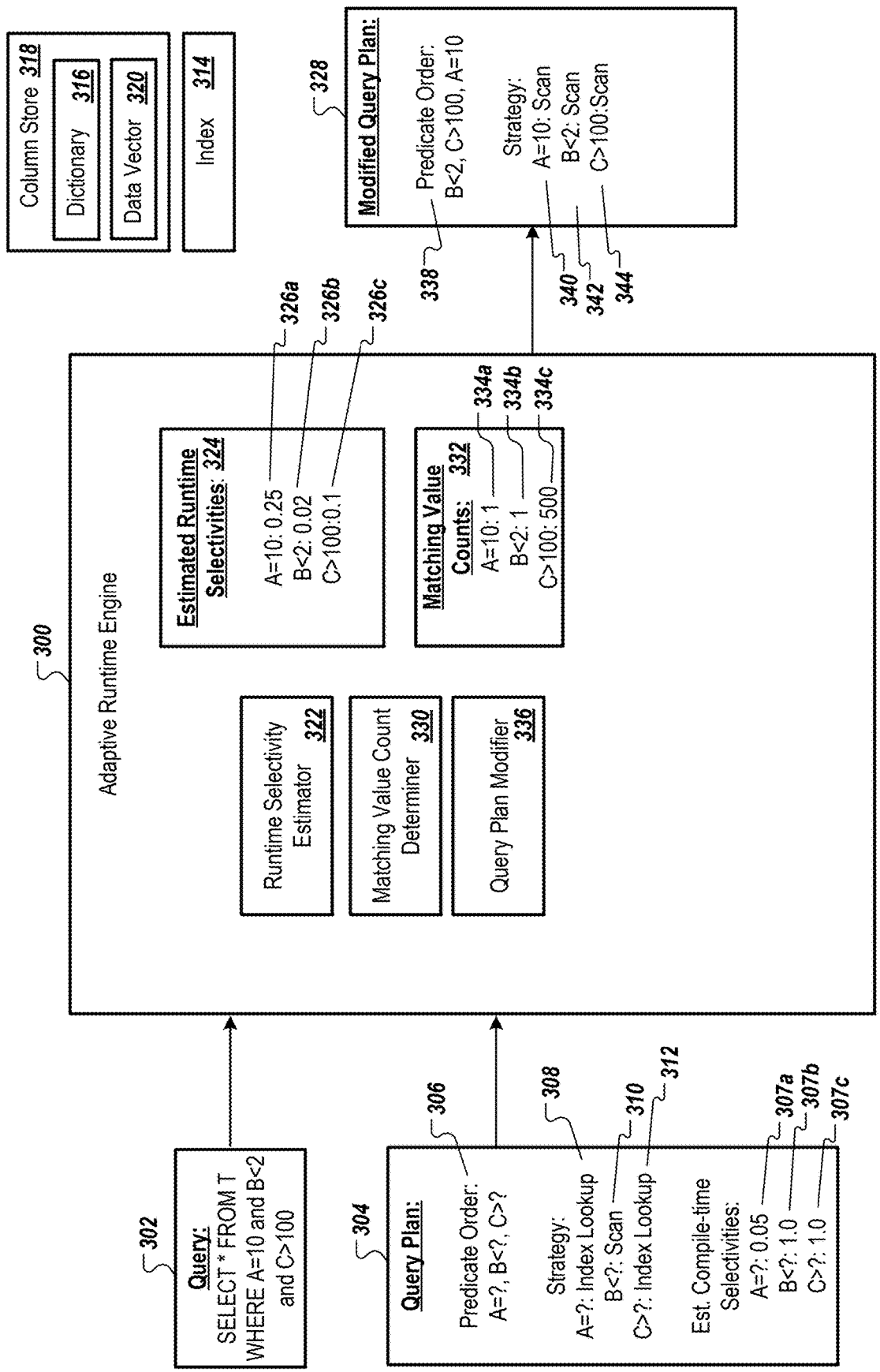
FIG. 3 illustrates an example adaptive runtime engine.

FIG. 3 illustrates an example adaptive runtime engine 300. The adaptive runtime engine 300 can be the adaptive runtime engine 132 of FIG. 1. The adaptive runtime engine 300 can receive a query 302 at runtime. An example query statement of "SELECT * FROM T WHERE A=10 and B<2 and C>100" is shown for the query 302 for discussion purposes. The adaptive runtime engine 300 (or more generally the query execution engine 120) can identify a query plan 304 that corresponds to the query 302. The query plan 304 can be a precompiled query plan compiled by the query plan compiler 116, for example.

The query plan 304 includes a predicate evaluation order 306 that indicates a recommended order of evaluating predicates in in the query 302. For instance, the predicate evaluation order 306 is a recommendation to the query execution engine 120 to evaluate predicates in order of predicates of the forms 'A=?', 'B<?', and 'C>?'. As described above, the predicate evaluation order 306 may have been previously determined during query compilation based, at least in part, on compile-time estimated selectivities of predicates determined from a previously-received first set of parameter values and/or based, at least in part, on estimated worst-case selectivities for predicates. For instance, for reference, estimated compile-time selectivities 307a, 307b, and 307c of 0.05, 1.0, and 1.0 are shown for predicates of the forms 'A=?', 'B<?', and 'C>?', respectively.

The query plan 304 also includes a predicate evaluation strategy for each predicate. For example, predicate evaluation strategies of an index lookup strategy 308, a data vector scan strategy 310, and an index lookup strategy 312 are listed in the query plan for predicates of the forms 'A=?', 'B<?', and 'C>?', respectively. An index lookup strategy for a predicate can direct the query execution engine 120 to perform a lookup in an index 314 for values in a dictionary 316 of a column store 318 that match the predicate. A data vector scan strategy for a predicate can direct the query execution engine 120 to perform a data scan of a data vector 320 to identify row positions of rows of the table that match values in the dictionary 316 that match the predicate.

The adaptive runtime engine 300 can, for some parameter values for some queries, perform dynamic runtime adaptations of the query plan 304 to improve query execution performance of those queries. For example, a runtime selectivity estimator 322 can determine estimated runtime selectivities 324 of the predicates in the query 302 based on the actual parameter values of the predicates. For example, estimated runtime selectivities 326a, 326b, and 326c for the 'A=10', 'B<2', and 'C>100' predicates are 0.25, 0.02, and 0.1, respectively (e.g., differing from the corresponding estimated compile-time selectivities 307a, 307b, and 307c). As described above regarding estimating selectivity based on a first parameter set, the runtime selectivity estimator 322 can determine the estimated runtime selectivities 324 based on using top-K statistics, sampling, or other approaches. The adaptive runtime engine 300 can use the estimated runtime selectivities 324 as part of creating a modified query plan 328, as described below.

The adaptive runtime engine 300 also includes a matching value count determiner 330 that determines matching value counts 332 of predicates in the query 302. A respective matching value count for a predicate in the matching value counts 332 indicates a count of distinct values in the dictionary 316 that match the predicate. For example, matching value counts 334a, 334b, and 334c indicate that the predicates 'A=10', 'B<2', and 'C>100' match one, one, or one hundred distinct values in the dictionary 316, respectively.

A query plan modifier 336 of the adaptive runtime engine 300 can generate the modified query plan 328 (e.g., as a modified version of the query plan 304) based on the matching value counts 332 and/or on the estimated runtime selectivities 324. For instance, the query plan modifier 336 can determine: 1) that for the predicate 'A=10', the estimated runtime selectivity 326a of 0.25 is greater than the corresponding estimated compile-time selectivity 307a of 0.05; that for the predicate 'B<2', the estimated runtime selectivity 326b of 0.02 is less than the corresponding estimated compile-time selectivity 307b of 1.0; and that for the predicate 'C>100', the estimated runtime selectivity 326c of 0.1 is less than the corresponding estimated compile-time selectivity 307c of 1.0 Accordingly, the query plan modifier 336 can determine an updated predicate evaluation order 338 of 'B<2', 'C>100', 'A=10', which differs from the predicate evaluation order 306 of the query plan. For instance, predicates with lower-valued runtime estimated selectivities can be placed earlier in the updated predicate evaluation order 338, so that intermediate results are smaller, thus saving computing resources during query execution.

As an example, the predicate 'A=10' on column A is moved later in the predicate evaluation order 338 (as compared to the predicate evaluation order 306 in the query plan), based on having a larger estimated runtime selectivity than previously estimated (and/or based on having a larger estimated runtime selectivity than other predicates). The 'B<2' predicate is now first in the predicate evaluation order 338.

The query plan modifier 336 can also determine to change a predicate evaluation strategy for the 'A=10' predicate to a data vector scan strategy 340 (e.g., modified from the index lookup strategy 308). For instance, since the 'A=10' predicate is now after the 'B<2' predicate, the adaptive runtime engine 300 can determine to no longer perform an index lookup for the 'A=10' predicate. For instance, the adaptive runtime engine 300 may determine (or may be likewise configured) to perform an index lookup for a first predicate of a conjunction but not second and following predicates of the conjunction. For instance, for the second and following predicates of the conjunction, the query execution engine can leverage an intermediate result after evaluating the first (e.g., most selective) predicate so that a scan on the rows of the intermediate result is cheaper than doing an index lookup that might also find rows outside of the intermediate result and would therefore require another intersection with the intermediate result.

Predicate evaluation strategies can be changed by the query plan modifier 336 for other reasons. For example, the query plan modifier 336 can determine to change a predicate evaluation strategy for the 'C>100' predicate to a data vector scan strategy 344 (e.g., modified from the index lookup strategy 312), based on the matching value count 334c being greater than a threshold. The query plan modifier 336 can select the data vector scan strategy 344 for the 'C>100' predicate to avoid a collectively-expensive set of multiple index lookups, for example.

Figure 4:
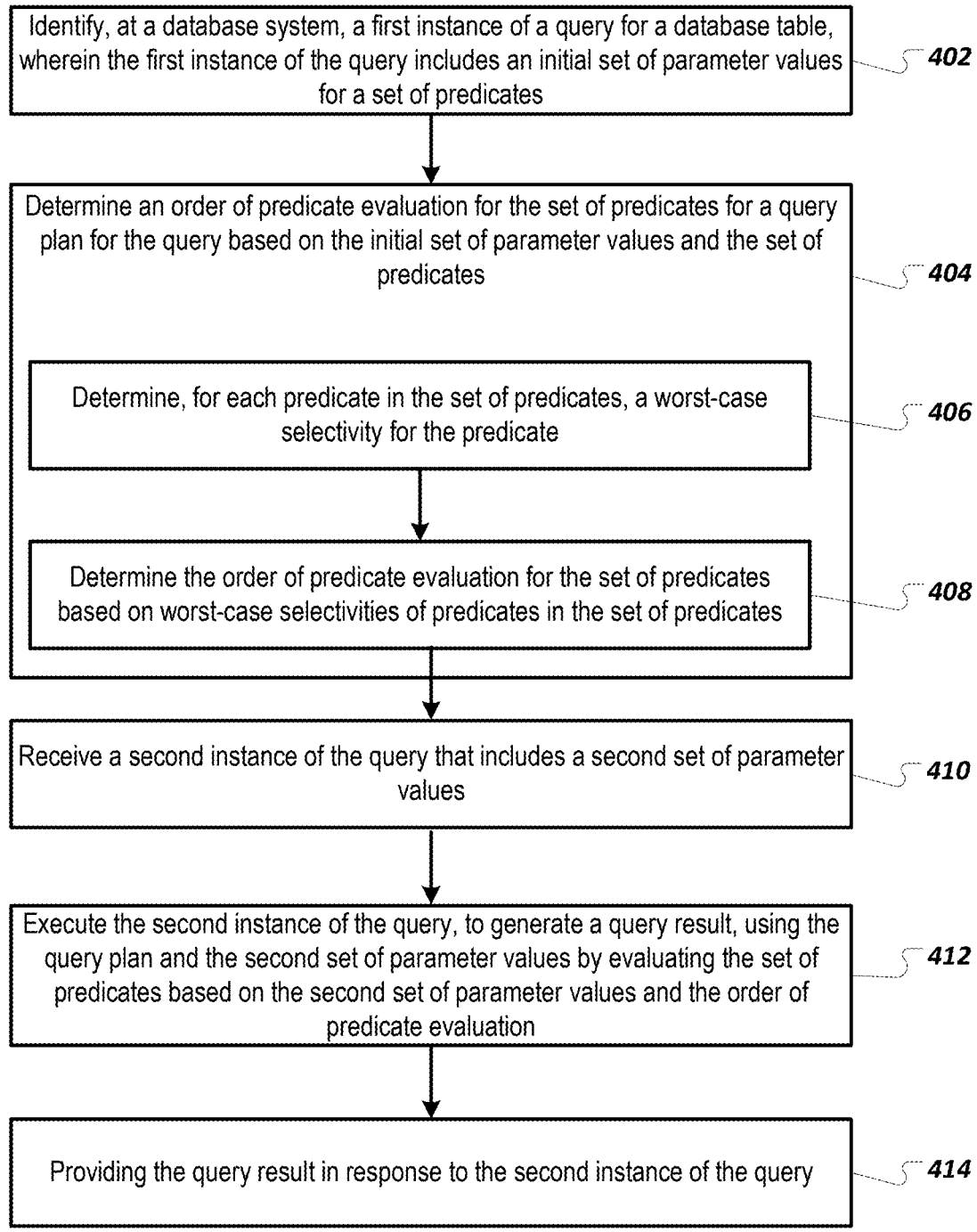
FIG. 4 is a flowchart of an example method for ordering evaluation of query predicates based on worst-case selectivity estimates.

FIG. 4 is a flowchart of an example method for ordering evaluation of query predicates based on worst-case selectivity estimates. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1 and/or FIG. 2. For example, the method 400 and related methods can be executed by the worst-case selectivity compile-time engine 130 of FIG. 1 or the worst-case selectivity compile-time engine 200 of FIG. 2.

At 402, a first instance of a query for a database table is identified, at a database system. The first instance of the query includes an initial set of parameter values for a set of predicates.

At 404, an order of predicate evaluation is determined for the set of predicates for a query plan for the query based on the initial set of parameter values and the set of predicates. Determining the order of predicate evaluation includes the next two steps.

At 406, a worst-case selectivity is determined for each predicate in the set of predicates. Selectivity of a given predicate corresponds to a percentage of table rows of the database table that are estimated to match the given predicate. Determining a worst-case selectivity for a given predicate can include estimating a largest possible selectivity value for the predicate (e.g., by estimating an upper bound for a number of rows that match the predicate). The worst-case selectivity for a given predicate can be determined, based in part, on an operator type of the predicate. As an example, determining the worst-case selectivity for the first predicate can include: determining that the operator type of the first predicate is an equals operator; obtaining frequency metadata for a database column referenced by the first predicate that includes frequencies of most-frequently occurring values in the database column; and determining, as the worst-case selectivity for the first predicate, a frequency of a highest-occurring value in the database column divided by a row count of the table. As another example, determining the worst-case selectivity for the first predicate can include: determining that the operator type of the first predicate corresponds to a range operation; and determining, as the worst-case selectivity for the first predicate, a selectivity value of one. Similar determinations of worst-case selectivity values of one can be determined for predicates having other operator types, such as LIKE (e.g., "A LIKE?"), like with regular expression (e.g., "A LIKE_REGEX?"), not-equal (e.g., "A< >?), or other operator types. As yet another example, determining the worst-case selectivity for a predicate can include determining that a column referenced in the predicate stores unique values, and thus the estimated worst-case selectivity can be determined by calculating a value of one divided by a row count of the table. For predicates referencing a table that stores unique values, a lookup in the frequency metadata (e.g., top-K values) for a parameter value of the predicate can be avoided.

At 408, the order of predicate evaluation for the set of predicates is determined based on the worst-case selectivities of predicates in the set of predicates. Determining the order of predicate evaluation for the set of predicates based on worst-case selectivities of predicates in the set of predicates can include ordering the predicates in an ascending worst-case selectivity order. Determining the order of predicate evaluation for the set of predicates based on worst-case selectivities of predicates in the set of predicates can include ordering the predicates based on a cost function that includes, for an input predicate, among other inputs, the worst-case selectivity of the input predicate.

At 410, a second instance of the query is received that includes a second set of parameter values.

At 412, the second instance of the query is executed, to generate a query result, using the query plan and the second set of parameter values by evaluating the set of predicates based on the second set of parameter values and the order of predicate evaluation determined based on worst-case selectivities of predicates in the set of predicates.

At 414, the query result is provided in response to the second instance of the query.

In some implementations, a secondary ordering of predicate evaluation can be performed based on estimated selectivities of predicates in the set of predicates determined based on the initial set of parameters. For example, performing the secondary ordering can include identifying two or more predicates that have a same worst-case selectivity and ordering the two or more predicates based on the estimated selectivities of predicates in the set of predicates determined based on the initial set of parameters. As an example, an estimated selectivity of a first predicate of the two or more predicates can be determined based on: locating a first parameter value in the initial set of parameter values in frequency statistic metadata for the database table; and determining the estimated selectivity of the first predicate by identifying a frequency for the first parameter value in the frequency statistic metadata. As another example, an estimated selectivity of a first predicate of the two or more predicates can be determined based on sampling the database table and determining a frequency of sampled rows of the database table that match the first predicate with respect to a parameter value in the initial set of parameter values. As yet another example, an estimated selectivity of a first predicate of the two or more predicates can be determined by: determining that the first predicate includes an equals operator; determining that a column referenced in the first predicate stores unique values; and determining the estimated selectivity of the first predicate by dividing a value of one by a row count of the database table. As described above, an estimated selectivity can also be determined for a predicate that includes an in-list operator, by calculating a value of a count of in-list elements divided by the row count of the table.

Figure 5:
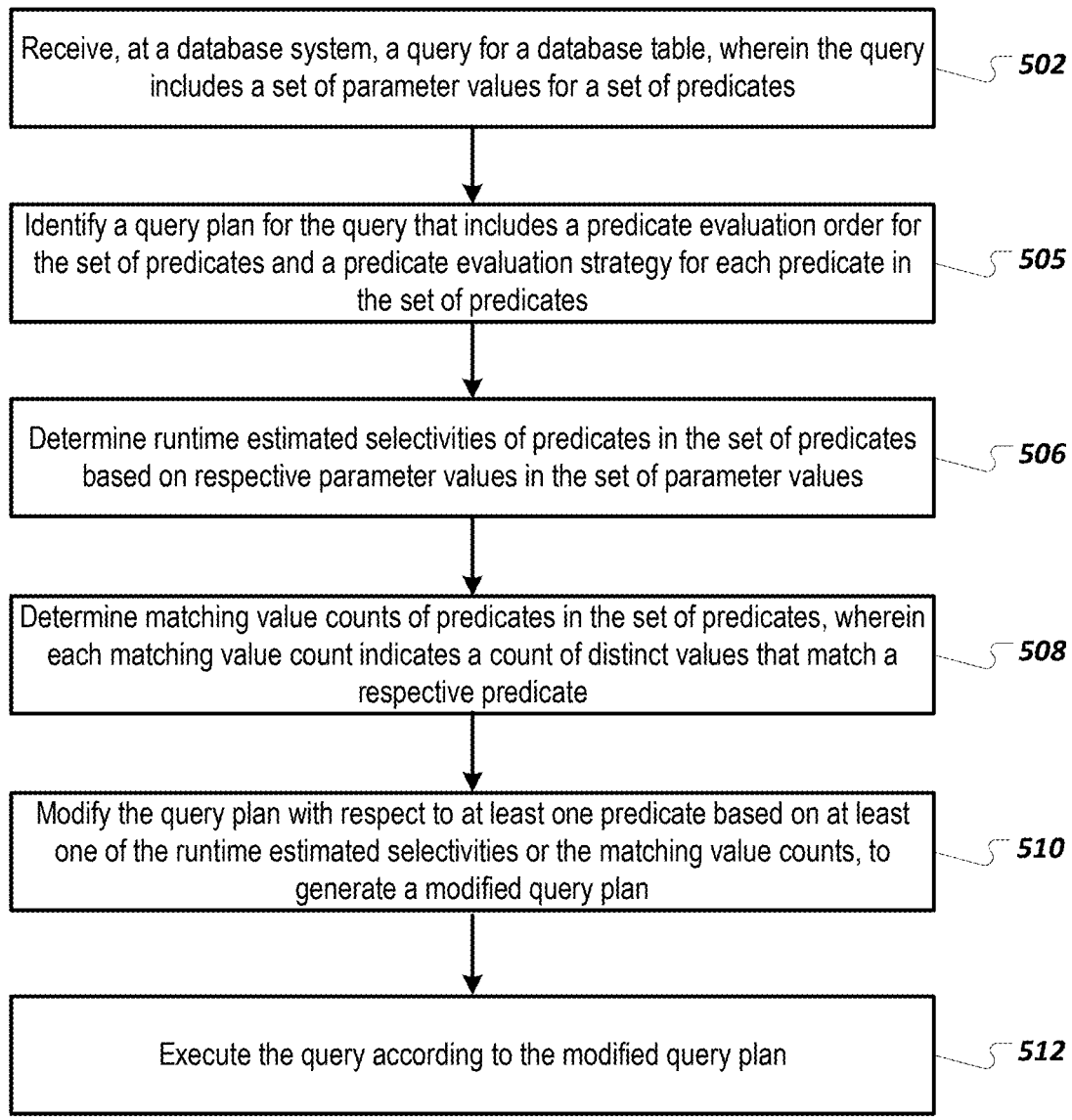
FIG. 5 is a flowchart of an example method for dynamically adapting query plans for database queries.

FIG. 5 is a flowchart of an example method for dynamically adapting query plans for database queries. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the runtime adaptive engine 134 of FIG. 1.

At 502, a query for a database table is received at a database system. The query includes a set of parameter values for a set of predicates.

At 504, a query plan for the query is identified that includes a predicate evaluation order for the set of predicates and a predicate evaluation strategy for each predicate in the set of predicates. Predicate evaluation strategies can include index lookup, data vector scan, and other strategies. The predicate evaluation order may have been previously determined during query compilation, such as based on compile-time estimated selectivities of predicates, worst-case selectivity, estimates, and/or other factors.

At 506, runtime estimated selectivities of predicates in the set of predicates are determined based on respective parameter values in the set of parameter values. The runtime estimated selectivity of a predicate corresponds to a percentage of table rows of the database table that are estimated to match the predicate with respect to a parameter value in the set of parameters. The runtime estimated selectivity of a predicate can be determined based on locating a first parameter value of the set of parameter values in frequency statistic metadata for the database table, sampling the database table and determining how many sampled rows of the database table match the first predicate with respect to a first parameter value of the set of parameters, or other approaches.

At 508, matching value counts of predicates in the set of predicates are determined. Each matching value count indicates a count of distinct values that match a respective predicate.

At 510, the query plan is modified with respect to at least one predicate based on at least one of the runtime estimated selectivities or the matching value counts, to generate a modified query plan. Modifying the query plan can include changing the predicate evaluation order based on at least one runtime estimated predicate selectivity being more than a first threshold. As another example, modifying the query plan comprises changing a predicate evaluation strategy for a first predicate from an index lookup strategy to a data vector scan strategy based on a matching value count for the first predicate being more than a second threshold. The predicate evaluation strategy for the first predicate can be changed from the index lookup strategy to the data vector scan strategy to avoid multiple index lookups of multiple different values, for example, and/or to enable data vector scan parallelism.

At 512, the query is executed according to the modified query plan.

FIG. 6 is a graph 600 that illustrates results of ordering evaluation of query predicates based on worst-case selectivity estimates. The graph 600 plots processor usage time for four scenarios 602, 604, 606, and 608 in which a query plan is compiled based on either a first parameter set or a second parameter set and then executed using either the first parameter set or the second parameter set. Each scenario 602, 604, 606, and 608 includes evaluation of a first approach that involves using a respective parameter set to estimate predicate selectivities and to then order, in a query plan, evaluation of predicates based on the estimated selectivities. Each scenario 602, 604, 606, and 608 also includes, for comparison, use of a second approach that orders query predicates in the query based on estimated worst case selectivities.

For example, one of the following approaches are used for the scenarios 602, 604, 606, and 608, respectively: the query plan is compiled with the first parameter set and the query is executed using the first parameter set; the query plan is compiled with the first parameter set and the query is executed using the second parameter set; the query plan is compiled with the second parameter set and the query is executed using the second parameter set; or the query plan is compiled with the second parameter set and the query is executed using the first parameter set.

Results 608 and 610 are plotted for the scenario 604 that show, respectively results of executing the query with the second parameter set using the first approach of ordering predicates based on estimated selectivities determined from the first parameter set or the second approach of ordering predicates based on estimated worst-case selectivities. As illustrated, the result 608 is substantially worse (e.g., slower) than the result 610. That is, the use of the second approach of using a query plan based on worst-case selectivities substantially outperformed a substantially slow result obtained by using the first approach of using estimated predicate selectivities determined from a parameter set different from one used during query execution.

However, in scenarios 602, 606, and 608, respective results 612, 614, and 616 obtained from using the second approach of using worst-case selectivities are worse (e.g., have regressed) as compared to corresponding respective results 618, 620, and 622 obtained from using the first approach of using estimated selectivities. That is, the graph 600 illustrates a substantial improvement of a substantially worst-performing scenario (e.g., scenario 604) but a lesser regression for other scenarios (e.g., scenarios 602, 606, and 608). However, the use of the adaptive runtime approach described in FIG. 3 for some scenarios (while using the worst-case selectivity approach where appropriate) can result in avoidance of the regressions shown in scenarios 602, 606, and 608, by using the described runtime adaptations to avoid such regressions.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
identifying, at a database system, a first instance of a query for a database table, wherein the first instance of the query includes an initial set of parameter values for a set of predicates;
determining an order of predicate evaluation for the set of predicates for a query plan for the query based on the initial set of parameter values and the set of predicates, wherein determining the order of predicate evaluation comprises:
determining, for each predicate in the set of predicates, a worst-case selectivity for the predicate; and
determining the order of predicate evaluation for the set of predicates based on worst-case selectivities of predicates in the set of predicates;
receiving a second instance of the query that includes a second set of parameter values;
executing the second instance of the query, to generate a query result, using the query plan and the second set of parameter values by evaluating the set of predicates based on the second set of parameter values and the order of predicate evaluation determined based on worst-case selectivities of predicates in the set of predicates; and
providing the query result in response to the second instance of the query.

2. The computer-implemented method of claim 1, wherein selectivity of a given predicate corresponds to a percentage of table rows of the database table that are estimated to match the given predicate.

3. The computer-implemented method of claim 1, wherein the worst-case selectivity for a first predicate is determined, based in part, on an operator type of the first predicate.

4. The computer-implemented method of claim 3, wherein determining the worst-case selectivity for the first predicate comprises:
determining that the operator type of the first predicate is an equals operator;
obtaining frequency metadata for a database column referenced by the first predicate that includes frequencies of most-frequently occurring values in the database column; and
determining, as the worst-case selectivity for the first predicate, a frequency of a highest-occurring value in the database column.

5. The computer-implemented method of claim 3, wherein determining the worst-case selectivity for the first predicate comprises:

determining that the operator type of the first predicate corresponds to a range operation; and determining, as the worst-case selectivity for the first predicate, a selectivity value of one.

6. The computer-implemented method of claim 1, wherein determining the order of predicate evaluation for the set of predicates based on worst-case selectivities of predicates in the set of predicates comprises ordering the predicates in an ascending worst-case selectivity order.

7. The computer-implemented method of claim 1, wherein determining the order of predicate evaluation for the set of predicates based on worst-case selectivities of predicates in the set of predicates comprises ordering the predicates based on a cost function that includes, for an input predicate, among other inputs, the worst-case selectivity of the input predicate.

8. The computer-implemented method of claim 1, further comprising performing a secondary ordering of predicate evaluation based on estimated selectivities of predicates in the set of predicates determined based on the initial set of parameters.

9. The computer-implemented method of claim 8, wherein performing the secondary ordering comprises identifying two or more predicates that have a same worst-case selectivity and ordering the two or more predicates based on the estimated selectivities of predicates in the set of predicates determined based on the initial set of parameters.

10. The computer-implemented method of claim 9, wherein an estimated selectivity of a first predicate of the two or more predicates is determined based on:

locating a first parameter value in the initial set of parameter values in frequency statistic metadata for the database table; and determining the estimated selectivity of the first predicate by identifying a frequency for the first parameter value in the frequency statistic metadata.

11. The computer-implemented method of claim 9, wherein an estimated selectivity of a first predicate of the two or more predicates is determined based on sampling the database table and determining a frequency of sampled rows of the database table that match the first predicate with respect to a parameter value in the initial set of parameter values.

12. The computer-implemented method of claim 9, wherein an estimated selectivity of a first predicate of the two or more predicates is determined by:

determining that a column referenced in the first predicate stores unique values; and determining the estimated selectivity of the first predicate by dividing a value of one by a row count of the database table.

13. The computer-implemented method of claim 1, wherein determining a worst-case selectivity for a given predicate comprises estimating a highest possible selectivity for the predicate.

14. The computer-implemented method of claim 1, wherein the set of predicates are included in a conjunction.

15. A system comprising:

one or more computers; and a computer-readable medium coupled to the one or more computers having instructions stored thereon which, when executed by the one or more computers, cause the one or more computers to perform operations comprising:

identifying, at a database system, a first instance of a query for a database table, wherein the first instance of the query includes an initial set of parameter values for a set of predicates;

determining an order of predicate evaluation for the set of predicates for a query plan for the query based on the initial set of parameter values and the set of predicates, wherein determining the order of predicate evaluation comprises:

determining, for each predicate in the set of predicates, a worst-case selectivity for the predicate; and determining the order of predicate evaluation for the set of predicates based on worst-case selectivities of predicates in the set of predicates;

receiving a second instance of the query that includes a second set of parameter values;

executing the second instance of the query, to generate a query result, using the query plan and the second set of parameter values by evaluating the set of predicates based on the second set of parameter values and the order of predicate evaluation determined based on worst-case selectivities of predicates in the set of predicates; and providing the query result in response to the second instance of the query.

16. The system of claim 15, wherein selectivity of a given predicate corresponds to a percentage of table rows of the database table that are estimated to match the given predicate.

17. The system of claim 15, wherein the worst-case selectivity for a first predicate is determined, based in part, on an operator type of the first predicate.

18. A computer program product encoded on a non-transitory storage medium, the product comprising non-transitory, computer readable instructions for causing one or more processors to perform operations comprising:

identifying, at a database system, a first instance of a query for a database table, wherein the first instance of the query includes an initial set of parameter values for a set of predicates;

determining an order of predicate evaluation for the set of predicates for a query plan for the query based on the initial set of parameter values and the set of predicates, wherein determining the order of predicate evaluation comprises:

determining, for each predicate in the set of predicates, a worst-case selectivity for the predicate; and determining the order of predicate evaluation for the set of predicates based on worst-case selectivities of predicates in the set of predicates;

receiving a second instance of the query that includes a second set of parameter values;

executing the second instance of the query, to generate a query result, using the query plan and the second set of parameter values by evaluating the set of predicates based on the second set of parameter values and the order of predicate evaluation determined based on worst-case selectivities of predicates in the set of predicates; and providing the query result in response to the second instance of the query.

19. The computer program product of claim 18, wherein selectivity of a given predicate corresponds to a percentage of table rows of the database table that are estimated to match the given predicate.

20. The computer program product of claim 18, wherein the worst-case selectivity for a first predicate is determined, based in part, on an operator type of the first predicate.

* * * * *